United States Patent
Masuyama et al.

(10) Patent No.: US 8,069,344 B2
(45) Date of Patent: Nov. 29, 2011

(54) SYSTEM AND METHOD FOR ANALYZING CPU PERFORMANCE FROM A SERIAL LINK FRONT SIDE BUS

(75) Inventors: Jinsaku Masuyama, Cedar Park, TX (US); Bi-Chong Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1008 days.

(21) Appl. No.: 11/855,436

(22) Filed: Sep. 14, 2007

(65) Prior Publication Data

US 2009/0077365 A1 Mar. 19, 2009

(51) Int. Cl.
G06F 9/24 (2006.01)
G06F 15/177 (2006.01)
(52) U.S. Cl. .................................. 713/2; 713/1
(58) Field of Classification Search ............ 713/1, 2
See application file for complete search history.

(56) References Cited

U.S. PATENT DOCUMENTS

| | | | |
|---|---|---|---|
| 6,697,962 B1 * | 2/2004 | McCrory et al. | 714/27 |
| 6,842,865 B2 | 1/2005 | Nee et al. | 714/28 |
| 7,017,081 B2 | 3/2006 | Gomez | 714/30 |
| 7,225,327 B1 * | 5/2007 | Rasmussen et al. | 713/2 |
| 7,243,221 B1 | 7/2007 | Ryser | 713/1 |
| 7,301,822 B1 | 11/2007 | Walstrum, Jr. et al. | 365/189.01 |
| 7,310,000 B2 | 12/2007 | Ong | 324/765 |
| 7,376,870 B2 * | 5/2008 | Kataria et al. | 714/47 |
| 7,610,482 B1 * | 10/2009 | Lok | 713/2 |
| 2004/0073637 A1 * | 4/2004 | Larson et al. | 709/222 |
| 2005/0210232 A1 * | 9/2005 | Hsu | 713/2 |
| 2007/0214386 A1 * | 9/2007 | Watanabe | 714/13 |
| 2008/0046707 A1 * | 2/2008 | Hirai et al. | 713/1 |
| 2009/0025008 A1 * | 1/2009 | Hung | 719/312 |

* cited by examiner

*Primary Examiner* — Vincent Tran
(74) *Attorney, Agent, or Firm* — Hamilton & Terrile, LLP; Robert W. Holland

(57) ABSTRACT

Monitoring of boot progress for a multiprocessor information handling system is performed with a test module running on a CPLD. RAM integrated in the CPLD stores boot progress information passed through an I/O buffer located between the processors and the firmware that boots the processors. Downloading of the boot progress from the RAM to an external device, such as through a serial port, provides a processor trace that is analysis and debugging of the firmware by recording processor operations through the boot progress.

20 Claims, 2 Drawing Sheets

SYSTEM AND METHOD FOR ANALYZING CPU PERFORMANCE FROM A SERIAL LINK FRONT SIDE BUS

BACKGROUND OF THE INVENTION

1. Field of the Invention

The present invention relates in general to the field of information handling system CPU performance analysis, and more particularly to a system and method for analyzing CPU performance from a serial link front side bus.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems that manage complex tasks, such as servers, are often configured with multiple central processing units (CPUs) that cooperate to process information. Firmware loaded on a chipset within the information handling system coordinates power-up of the CPUs to load and run one or more operating systems so that the CPUs share resources loaded on the information handling system, such as memory using Non-uniform Memory Access (NUMA). During the design of NUMA multi-processor systems, engineers attempt to confirm that firmware has correctly brought the processors to an operational state by tracing the performance of firmware instructions by the processors. For example, with some systems engineers interface external equipment to the front side bus (FSB) of the CPUs to read analog signals output at the FSB. However, NUMA multi-processor systems communicate along the FSB using a serial link, such as the Hyper Transport (HT) link. Design of a CPU bus protocol analyzer that interfaces with a planar presents a complex and expensive task and, especially with multi-processor socket systems, does not offer a helpful tool for the development and debugging of firmware and hardware. For example, full speed operation of the CPUs may not be available with such an analyzer.

One difficulty with debugging multi-processor information handling systems is that some chipset settings require a system reset to take effect. Since all processors generally execute the same code path after a system reset, identifying a processor associated with a fault is particularly difficult where the fault occurs before system memory is fully configured. Available hardware tools, such as In-Circuit Emulator (ICE) available from America Arium, provide some assistance with firmware code development and debugging capability, however, such tools typically lack a processor trace capability. The lack of a processor trace capability makes identification of a fault difficult since the fault can arise from any one of plural processors that are running the same code.

SUMMARY OF THE INVENTION

Therefore, a need has arisen for a system and method that traces processor operations during startup of a multi-processor information handling system.

In accordance with the present invention, a system and method are provided which substantially reduce the disadvantages and problems associated with previous methods and systems for monitoring boot of an information handling system. Firmware of the information handling system tracks boot progress by monitoring communications boot instructions and storing the boot progress to memory for subsequent download.

More specifically, an information handling system having plural processors boots under boot instructions from firmware, such as a BIOS. The boot instructions and processor responses are passed through an I/O buffer. A Complex Programmable Logic Device (CPLD) interfaced with the I/O buffer retrieves communications between the firmware and the processors and stores progress of the boot in local memory. For example, a test module built with firmware instructions in the CPLD copies communications passed through the I/O bus to RAM integrated in the CPLD. After boot completes or when boot is otherwise halted, boot progress remains stored in CPLD RAM as long as power remains applied to the system. A test switch interfaced with the test module downloads the boot progress to an external device for analysis, such as through a serial bus interfaced with the CPLD RAM.

The present invention provides a number of important technical advantages. One example of an important technical advantage is that processor operations are traced during startup of a multi-processor information handling system to aid analysis and debugging of system firmware. Processor operations are traced without an external analyzer device by saving the processor operations to RAM and preserving the RAM by maintaining power to the system. For example, a CPLD module stores a trace of processor operations in RAM that remains retrievable by maintaining power to the system. For example, a download from RAM of CPLD test module monitoring provides a trace of processor launching and execution as initiated by firmware, such as the BIOS.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Tracing plural processors of an information handling system through boot is provided by a CPLD test module that monitors boot and stores boot progress in integrated memory. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
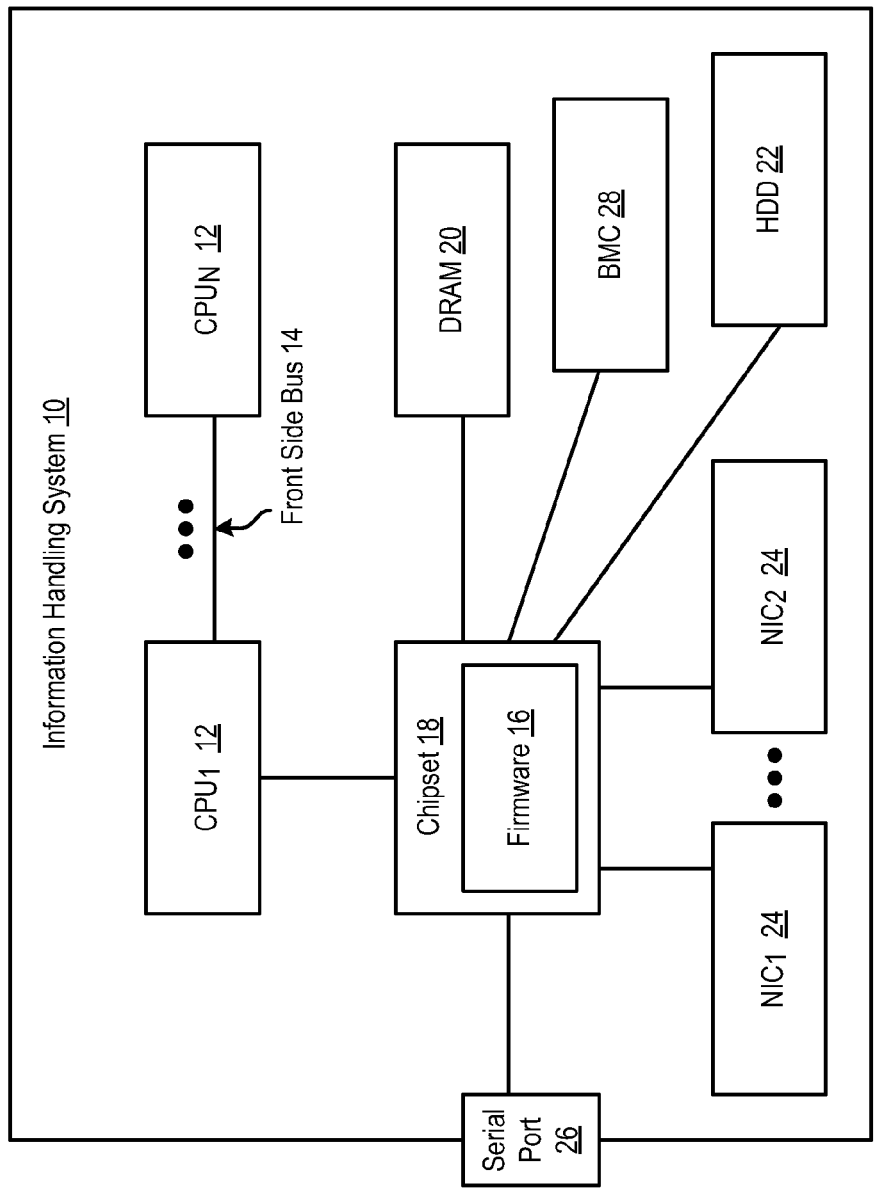
FIG. 1 depicts a block diagram of a multiprocessor server information handling system.

Referring now to FIG. 1, a block diagram depicts a multiprocessor server information handling system 10. Server information handling system 10 processes information with plural processors 12 that interface through a front side bus 14. Front side bus 14 is, for example, a coherent link using a serial protocol, such as the HyperTransport protocol. Processors 12 are booted to an operational state with firmware 16 that runs on a chipset 18. Processors 12 might have separate sockets or represent multiple cores built into a common integrated circuit. Once booted to an operational state, processors 12 run under the direction of an operating system to perform desired functions, such as networking functions defined by various applications. Volatile memory, such as DRAM 20, provides storage for CPUs 12 to use when running applications. Nonvolatile memory, such as a hard disk drive 22, provides permanent storage, such as for the operating system and applications. Communication with external devices is supported by network interface cards (NIC) 24, serial ports 26 and other types of ports. Remote management of server information handling system 10 is available through a baseboard management controller (BMC) 28 or other type of management device.

Figure 2:
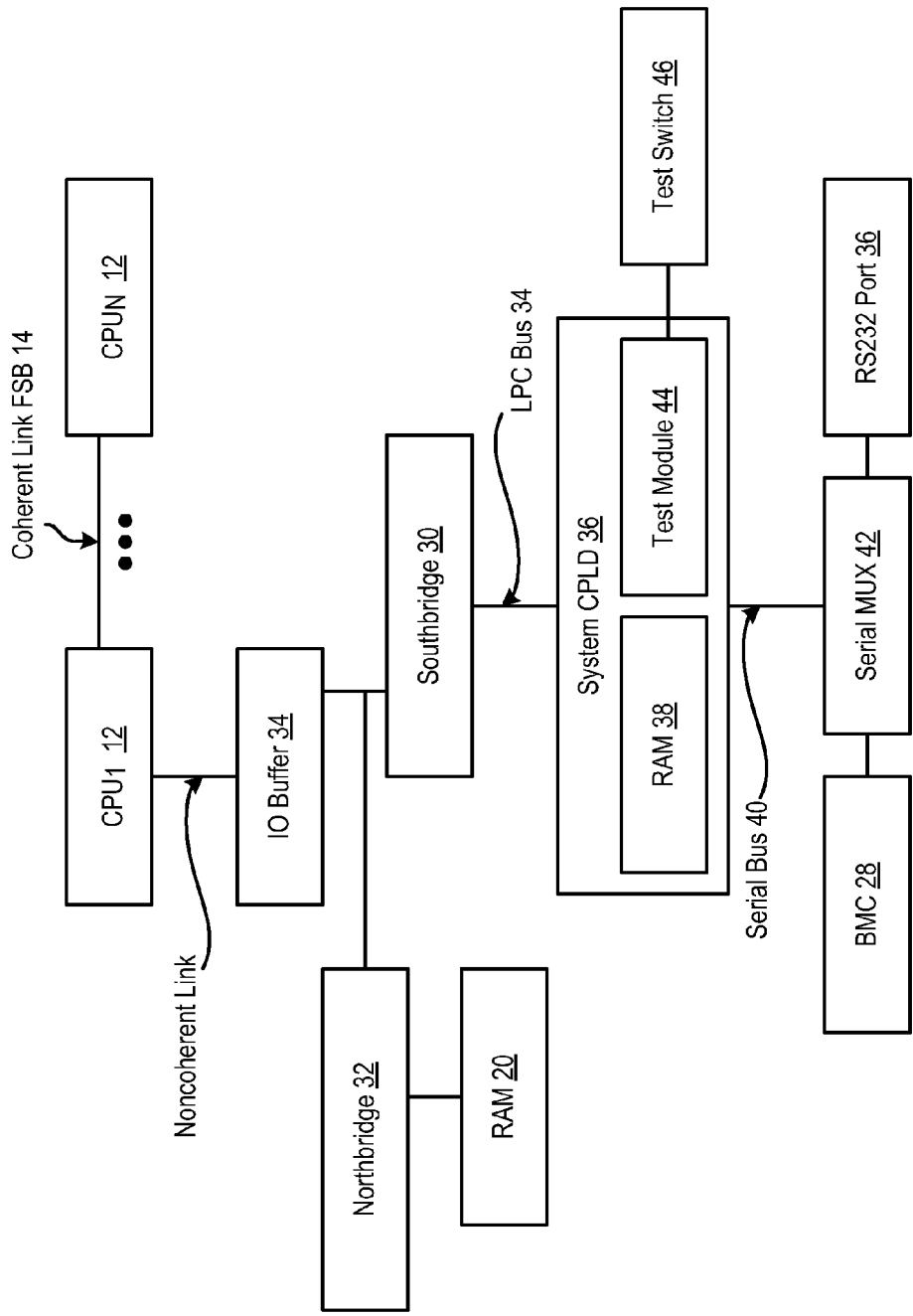
FIG. 2 depicts a block diagram of a system for monitoring boot progress of a multiprocessor information handling system.

Referring now to FIG. 2, a block diagram depicts a system for monitoring boot progress of a multiprocessor information handling system. A south bridge 30 within chipset 18 supports communication of firmware with CPUs, such as BIOS code called from a CMOS, and coordinates interfaces for I/O devices with CPUs 12. A north bridge 32 acts as a memory hub to coordinate communication between CPUs 12, RAM 20, and south bridge 30. During boot, firmware instructions from south bridge 30 pass through I/O buffer 34 to CPUs 12 and responses from CPUs 12 to the firmware instructions pass through I/O buffer 34 to south bridge 30. South bridge 30 interfaces through an LPC bus with a system Complex Programmable Logic Device (CPLD) 36 that includes firmware logic accessible at system power up. CPLD 36 includes integrated RAM 38 that acts as non-volatile memory as long as power is applied to the information handling system since CPLD receives power from system power up. CPLD 36 provides an external interface through a serial bus 40 and serial mux 42, which interfaces to BMC 28 and an RS232 port 26.

In order to trace operations of CPUs 12 before RAM 20 is configured, a test module 44 residing on CPLD 36 monitors boot progress, such as by monitoring boot instructions and processor responses that are passed through I/O buffer 34. Although each processor may execute the same code path after a system reset, monitoring of boot progress by CPLD test module 44 allows storage of processor specific instructions and responses in memory integrated within CPLD 36 before system memory is available, such as integrated RAM 38. As long as power remains applied to the information handling system, integrated CPLD RAM 38 maintains stored boot progress, even if the information handling system itself is not operational. A test switch 46 allows an end user to initiate a download of boot progress from RAM 38 to an external device through serial bus 40, such as through serial port 36 or BMC 28. Test module 44 initiates boot progress monitoring with one or more predetermined system events, such as hardware system resets from an AC cycle, a DC cycle, a HyperTransport power good hard reset that clears sticky bits, a HyperTransport soft reset that does not clear sticky bits, or a software system reset from a CF9 system reset initiated by BIOS, or chipset activities like HyperTransport or north bridge initialization.

Test module 44 monitors boot progress by simply copying boot instructions and responses communicated over I/O buffer 34 to integrated RAM 38 or, alternatively, performs analysis of boot instructions and responses with firmware running on CPLD 36. For example, initialization and timing of RAM 20 are tracked during DQS training. As another example, single-bit ECC errors are tracked with a history of ECC error symbols, error bits, DIMM error bitmaps, and similar indications. Processor tracing is tracked by monitoring processor activities, such as individual processor launching, execution, frequency and voltage changes and other indications initiated by firmware, such as system BIOS. Boot firmware, such as system BIOS, writes a byte data to FIFO data port for automatic storage in a 256-byte FIFO buffer that is shared between CPLD 36 and the BIOS. For the index I/O data buffer, the BIOS first writes a word offset (0 to 511) to index port followed by the a byte read/write to the data port. An example of boot progress for a normal boot launching APs initiated by a quad-core BIOS for two quad-core CPUs is:
Code Description
FD HT power good, hard reset
FC HT reset, CPU init
FB Southbridge generated system reset In the sample output, command codes E0 to FF are reserved for system hardware, such as the CPLD, to mark events to test module 44 and integrated RAM 38 to allow tracking of BIOS generated boot progress records. An example of CPLD generated information for storage in integrated memory 38 is:
Code Description
05 BSP is about to launch cores on all nodes (i.e. APs)
---Launching node 1, core 0----
24 BSP is launching core 0, node 1
34 core 0, node 1 is released from reset and starts init
06 BSP receives phase 1 done signal from AP
44 core 0, node 1 completes init and on the way to halt itself
---Launching node 0, core 1----
21 BSP is launching core 1, node 0
31 core 1, node 0 is released from reset and starts init
06 BSP receives phase 1 done signal from AP
41 core 1, node 0 completes init and on the way to halt itself
---Launching node 1, core 1----
25 BSP is launching core 1, node 1
35 core 1, node 1 is released from reset and starts init
06 BSP receives phase 1 done signal from AP
45 core 1, node 1 completes init and on the way to halt itself
--- Launching node 0, core 2----
22 BSP is launching core 2, node 0
32 core 2, node 0 is released from reset and starts init
06 BSP receives phase 1 done signal from AP 42 core 2, node 0 completes init and on the way to halt itself
---Launching node 1, core 2----
26 BSP is launching core 2, node 1
36 core 2, node 1 is released from reset and starts init
06 BSP receives phase 1 done signal from AP
46 core 2, node 1 completes init and on the way to halt itself
---Launching node 0, core 3----
23 BSP is launching core 3, node 0
33 core 3, node 0 is released from reset and starts init
06 BSP receives phase 1 done signal from AP
43 core 3, node 0 completes init and on the way to halt itself
--- Launching node 1, core 3----
27 BSP is launching core 3, node 1
37 core 3, node 1 is released from reset and starts init
06 BSP receives phase 1 done signal from AP
47 core 3, node 1 completes init and on the way to halt itself
OE BSP has successfully launched all cores
OF All cores completed FIDVID change (and on the way to halt), BSP completes Northbridge initialization Test switch 46 provides an I/O interface to download boot progress stored in integrated RAM 38. Boot progress remains in memory even in the event of system failure as long as power remains to the system and CPLD 36.

Although the present invention has been described in detail, it should be understood that various changes, substitutions, and alterations can be made hereto without departing from the spirit and scope of the invention as defined by the appended claims.

What is claimed is:

1. An information handling system comprising:
   plural processors operable to process information;
   a front side bus interfacing the processors with a serial link;
   firmware operable to boot the processors from an off state to an operational state with boot instructions executed on the processors;
   an I/O buffer interfacing the firmware with the processors;
   a Complex Programmable Logic Device (CPLD) interfaced with the I/O buffer and having integrated memory, the CPLD operable to monitor the boot instructions and store boot progress based upon boot instructions executed for each processor as indicated by communications through the I/O buffer, the CPLD storing the boot progress in the integrated memory; and
   a switch interfaced with the CPLD and operable to command download of the stored boot progress from the integrated memory.

2. The information handling system of claim 1 wherein the boot progress comprises launching of each processor by the firmware.

3. The information handling system of claim 1 wherein the boot progress comprises execution by each processor of boot instructions.

4. The information handling system of claim 1 wherein the boot progress comprises initialization of the front side bus by the firmware.

5. The information handling system of claim 1 further comprising DRAM wherein the boot progress comprises DRAM initialization and timing.

6. The information handling system of claim 1 further comprising a northbridge wherein the boot progress comprises northbridge initialization.

7. The information handling system of claim 1 wherein the CPLD retrieves information communicated across the I/O buffer by the firmware and processors.

8. The information handling system of claim 1 wherein the switch commands download of the stored boot progress to a serial port.

9. A method for monitoring boot progress of a multiprocessor information handling system having plural processors, the method comprising:
   generating boot instructions with firmware;
   communicating the boot instructions to the processors through an I/O buffer;
   communicating boot progress from the processors through the I/O buffer;
   monitoring execution of the boot instructions by the plural processors with a CPLD by retrieving boot progress from the I/O buffer to the CPLD; and
   storing boot progress in memory associated with the CPLD.

10. The method of claim 9 further comprising downloading the stored boot progress from the memory through a serial bus.

11. The method of claim 9 wherein the boot progress comprises launching of each processor by the firmware.

12. The method of claim 9 wherein the boot progress comprises execution by each processor of boot instructions.

13. The method of claim 9 wherein the boot progress comprises initialization of the front side bus by the firmware.

14. The method of claim 9 wherein the boot progress comprises DRAM initialization and timing.

15. The method of claim 9 wherein the boot progress comprises northbridge initialization.

16. The method of claim 9 wherein monitoring execution of the boot instructions with a CPLD further comprises copying boot instructions to the CPLD from the I/O buffer.

17. The method of claim 9 further comprising:
   halting the boot progress;
   maintaining power to the CPLD;
   retrieving the boot progress from the memory; and
   powering down the CPLD.

18. A system for tracing boot progress of plural processor in a multiprocessor information handling system, the system comprising:
   firmware operable to generate boot instructions for the plural processors to execute;
   an I/O buffer interfaced with the firmware and the plural processors, the I/O buffer operable store the boot instructions from the firmware for use by the plural processors and to receive boot progress information from the plural processors;
   a CPLD interfaced with the I/O buffer, the CPLD having integrated memory; and
   a test module running on the CPLD and operable to retrieve the boot instructions and boot progress information from the I/O buffer and store the boot instructions and boot progress information in the integrated memory.

19. The system of claim 18 wherein the I/O buffer is further operable to receive boot information from the processors for use by the firmware, and wherein the test module is further operable to store the boot information in the integrated memory.

20. The system of claim 18 further comprising a test switch interfaced with the test module and operable to initiate transfer of the boot instructions from the integrated memory to a port for communication to an external device.

* * * * *